United States Patent [19]

Engelhoven

[11] Patent Number: 5,718,271
[45] Date of Patent: Feb. 17, 1998

[54] STUMP CUTTING OR GRINDING APPARATUS AND METHOD

[76] Inventor: Ed Engelhoven, 6612 Jacksonville c/o, Apt. D, Jacksonville, Ark. 72076

[21] Appl. No.: 738,457

[22] Filed: Oct. 30, 1996

Related U.S. Application Data

[60] Provisional application No. 60/008,121, Oct. 30, 1995.

[51] Int. Cl.$^6$ .................................................. A01G 23/06
[52] U.S. Cl. ...................... 144/24.12; 60/431; 60/456; 37/302; 144/334; 241/101.71
[58] Field of Search .......................... 60/414, 431, 449, 60/452, 456; 241/101.71, 101.72, 101.74, 101.76; 417/34, 53; 144/2.1, 24.12, 334; 37/302

[56] References Cited

U.S. PATENT DOCUMENTS

| | | |
|---|---|---|
| 3,198,224 | 8/1965 | Hiley ..................................... 144/24.12 |
| 3,732,905 | 5/1973 | Pickel . |
| 3,931,841 | 1/1976 | Blum . |
| 4,074,447 | 2/1978 | Shivers, Jr. et al. . |
| 4,180,107 | 12/1979 | Grover . |
| 4,271,879 | 6/1981 | Shivers, Jr. et al. . |
| 4,402,352 | 9/1983 | Hodges . |
| 4,681,145 | 7/1987 | York . |
| 4,709,736 | 12/1987 | Bellars . |
| 5,109,895 | 5/1992 | Rassier . |
| 5,158,126 | 10/1992 | Lang . |
| 5,203,388 | 4/1993 | Bowling . |
| 5,289,859 | 3/1994 | Minton, Jr. et al. . |
| 5,355,918 | 10/1994 | Lang . |
| 5,381,840 | 1/1995 | Bowen . |
| 5,588,474 | 12/1996 | Egging ..................................... 144/334 |

*Primary Examiner*—W. Donald Bray
*Attorney, Agent, or Firm*—Mark A. Rogers; Gary N. Speed; Mark M. Henry

[57] ABSTRACT

A stump cutting or grinding apparatus and method are disclosed which utilize a pump for attachment to a power takeoff of a tractor, a cutting or grinding device for attachment to a backhoe arm of the tractor, a motor connected to the cutting or grinding device, a plurality of lines for circulating hydraulic fluid between the pump and the motor and a plurality of lines for passing a portion of the hydraulic fluid through the hydraulic system of the tractor. Passing a portion of the circulating hydraulic fluid through a hydraulic system of the tractor enables the tractor to cool and filter the fluid and eliminates the need for a separate tank or reservoir that would otherwise be needed to contain and treat fluid being circulated between the pump and motor. A scoop may be attached to the cutting or grinding device for moving or removing rocks, dirt or debris from around the stump.

20 Claims, 4 Drawing Sheets

STUMP CUTTING OR GRINDING APPARATUS AND METHOD

This application claim benefit of provisional patent application Ser. No. 60/008,121, filed on Oct. 30, 1995.

BACKGROUND OF THE INVENTION

This invention relates to an apparatus and method for cutting or grinding stumps and more particularly, to a tractor attachment for cutting or grinding stumps.

After a tree falls or is cut, it is typically desirable to remove the stump from the ground or to cut or grind the stump to a position near or below the surrounding terrain. This is often desirable for aesthetic purposes and for practical purposes so that the stump will not interfere with the operation of farm or lawn equipment or similar devices as they move across the affected area.

A variety of tree stump cutting and grinding devices are known in the art. The devices typically use horizontally or vertically disposed cutting or grinding wheels or drums that are rotated to cut away portions of the stump. The wheels are manipulated over the surface of the stump to gradually cut or grind away upper surfaces of the stump until the top surface of the stump is reduced or lowered to the desired level. For small to medium size jobs, a device on tires is often used that has an internal combustion motor, an extension arm that carries the cutting or grinding wheel and a chain drive for powering the wheel. These devices typically require a user to physically push or pull the device to position the wheel over the stump and require a user to physically manipulate the cutting or grinding wheel back and forth over the stump. These devices are slow, cumbersome and require a fair amount of strength and stamina to operate, particularly if a number of stumps are to be treated. These devices are also difficult or impossible to use in hard to reach areas, like in ditches or other areas having steep inclines or declines or other ragged terrain.

For larger jobs, cutting or grinding wheels or drums have been connected to booms of large caterpillar type tractors and have been powered by the powerful hydraulic system of the large tractors. Large, self-contained units have also been used for larger jobs. Like the smaller units, these units feature cutting or grinding wheels that are attached to a boom or an arm, and the units are typically hydraulically or mechanically operated and are powered by internal combustion engines. These self-contained units must be towed and moved around a site using other trucks or machinery. These devices work well for larger jobs, but the equipment costs are very high, the equipment is very large and difficult to transport and the large tractors with hydraulic systems powerful enough to power a cutting or grinding wheel are often too large to be used in small yards and other tight quarters in which it is often desirable cut or grind stumps.

Stump cutting or grinding devices have been proposed for use with smaller tractors, utilizing power supplied by a hydraulic pump connected to a power takeoff of a tractor. However, these devices have required the use of inconvenient, bulky tanks or reservoirs for storing and treating hydraulic fluid that is circulated to drive the motor and cutting or grinding wheels or drums. The systems have required the use of large amounts of excess hydraulic fluid, stored in large, bulky tanks or reservoirs. The systems have also required the use of separate filtering devices to treat the circulating hydraulic fluid which adds to the size, weight, cost and complexity of the systems. Further, these devices lack the capability of moving or removing rocks, dirt or other debris from around a stump in a safe manner or in a manner that does not risk damaging the cutting or grinding wheels or drums or teeth thereon.

SUMMARY OF THE INVENTION

It is therefore an object of the present invention to provide a stump cutting or grinding apparatus and method that may be powered by a pump attached to a power takeoff of a tractor.

It is a further object of the present invention to provide an apparatus and method of the above type that uses the hydraulic system of the tractor to filter and cool the hydraulic fluid used to power the cutting or grinding device.

It is a still further object of the present invention to provide an apparatus and method of the above type that does not need a separate storage tank or reservoir for hydraulic fluid.

It is a still further object of the present invention to provide an apparatus and method of the above type that does not need separate filtration, cooling or treatment equipment or capabilities.

It is a still further object of the present invention to provide an apparatus and method of the above type for treating stumps in hard to reach areas, such as in ditches, on steep inclines or declines or on other rugged terrain.

It is a still further object of the present invention to provide an apparatus and method of the above type for treating stumps in areas that are difficult or impossible to reach with larger tractors or machinery.

It is a still further object of the present invention to provide an apparatus and method of the above type in which a scoop is provided for safely moving or removing rocks, dirt or debris from around a stump.

It is a still further object of the present invention to provide an apparatus and method of the above type that is quickly and easily connected and disconnected to a small tractor.

It is a still further object of the present invention to provide an apparatus and method of the above type that is compact and easy to store, carry and use in connection with a small tractor.

It is a still further object of the present invention to provide an apparatus and method of the above type that minimizes the need for hydraulic fluid in addition to the hydraulic fluid already present in the hydraulic system of the tractor.

It is a still further object of the present invention to provide an apparatus and method of the above type that is easily interchangeable with a backhoe bucket.

It is a still further object of the present invention to provide an apparatus and method of the above type that utilizes linkage between the motor and cutting or grinding wheel or drum that protects the motor from damage due to rapidly changing loads on the cutting or grinding wheel or drum.

It is a still further object of the present invention to provide an apparatus and method of the above type that utilizes a plurality of belts to inexpensively connect the motor to the cutting or grinding wheel or drum while protecting the motor from damage due to sudden changes in the load on the cutting or grinding wheel or drum.

Toward the fulfillment of these and other objects and advantages, one embodiment of the stump cutting or grinding apparatus and method of the present invention comprises a pump for attachment to a power takeoff of a tractor, a cutting or grinding device for attachment to a backhoe arm of the tractor, a motor connected to the cutting or grinding device, a plurality of lines for circulating hydraulic fluid between the pump and the motor and a plurality of lines for passing a portion of the hydraulic fluid through a hydraulic system of the tractor. Another embodiment of the present invention comprises a cutting or grinding device having a frame, a cutting or grinding wheel or drum and a scoop.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
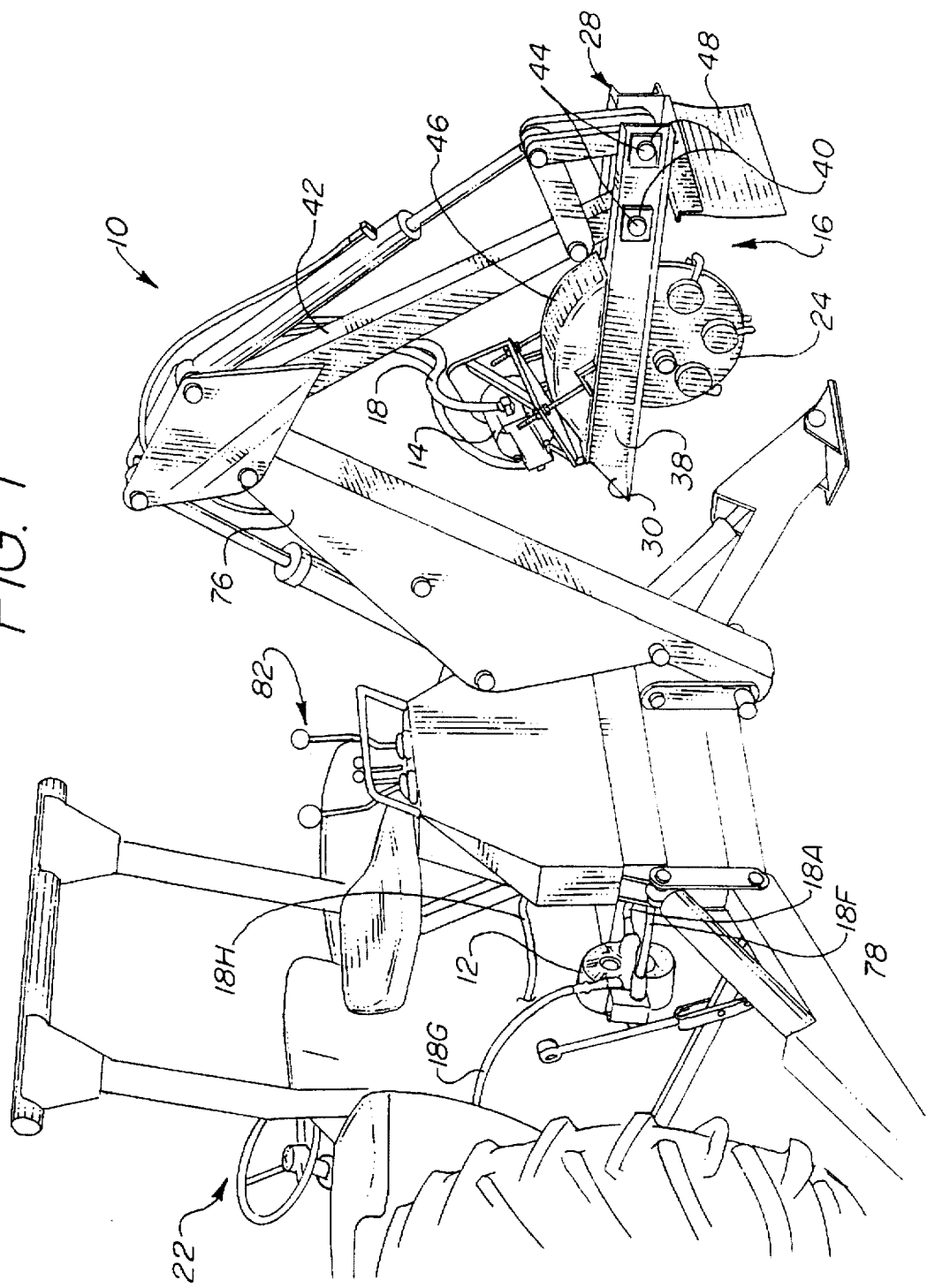
FIG. 1 is a perspective view of a tractor having a system of the present invention.

Referring to FIG. 1, the reference numeral 10 refers in general to a stump cutting or grinding apparatus of the present invention, comprising a pump 12, a motor 14, a cutting or grinding device 16 and lines 18 connecting the pump 12 and motor 14 and connecting the apparatus 10 to a hydraulic system 20 of a tractor 22.

The pump 12 is a hydraulic gear pump. The pump 12 has a circulating capacity that is preferably substantially within a range of approximately 15 to approximately 40 gallons per minute and that is more preferably substantially within a range of approximately 20 to approximately 25 gallons per minute. The pump 12 is adapted to be connected to a power takeoff of a tractor 22, particularly a rear power takeoff and is braced against rotation relative to the power takeoff in any conventional fashion.

The motor 14 is a hydraulic, heavy duty gear motor that is approximately 2.25 cubic inches. As discussed in more detail below, the motor is preferably operatively connected to a cutting or grinding wheel or drum 24 by four belts 26.

Figure 2:
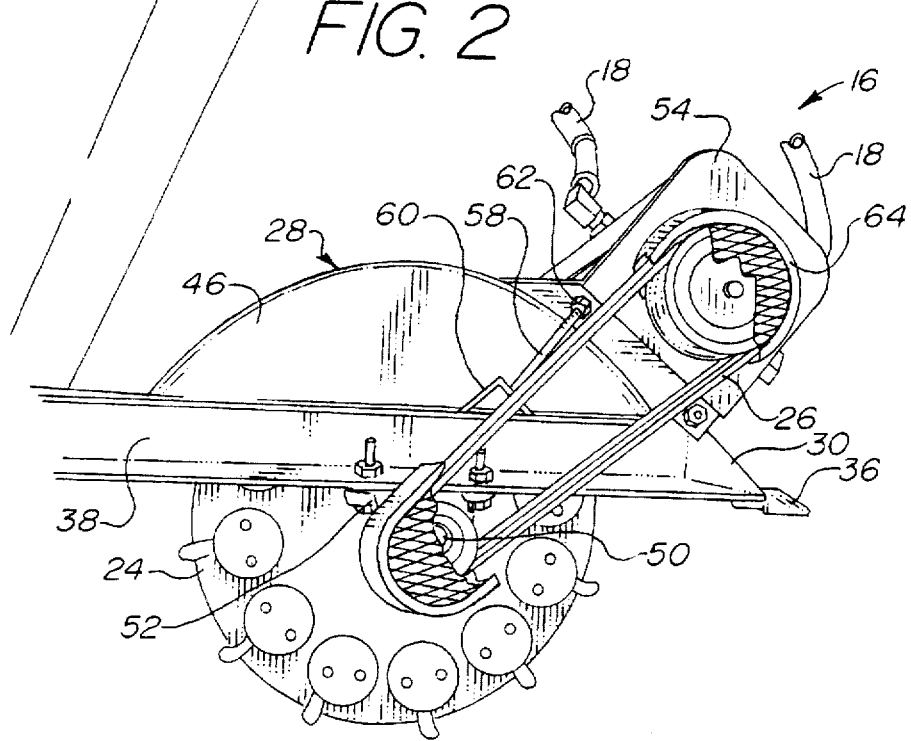
FIG. 2 is a side elevation view of a stump cutting device of the present invention attached to a backhoe arm.

As best shown in FIG. 2, the cutting or grinding device 16 comprises a frame 28 and a cutting or grinding wheel or drum 24 rotatably secured to the frame 28. In the preferred embodiment, a scoop 30 is attached to the frame 28, preferably to a rear end of the frame. The scoop 30 has a lower, substantially planar member 32 that extends rearward from the members 38 and has sides 34 extending upward from the lower member. The scoop 30 may also be provided with teeth 36.

The frame 28 has two pieces of three inch channel iron 38 with two shorter pieces of three inch channel iron welded between them. Each of the two longer members 38 have two apertures 40 that permit the cutting device 16 to be quickly and easily secured to a backhoe arm 42 of a tractor 22 using the two steel pins 44 that typically attach a bucket to the backhoe arm 42. A protective, convex guard 46 is secured to the top of the iron members 38. A protective rubber guard 48 is mounted on the underside of the frame 28 near the front of the frame. The cutting or grinding wheel or drum 24 is preferably an 18 inch cutting wheel like commercially available cutting wheels that are typically used in connection with the large, self-contained internal combustion units discussed above. Of course, any number of different cutting or grinding wheels or drums may be used. The cutting wheel 24 is rotatably mounted to the members 38 using a 1⅛ inch steel axle 50 that is mounted to the members 38 by two pillow block bearings 52.

The motor 14 is connected to the cutting device 16 by a motor mount 54 that is secured to the frame 28. The mount 54 is pivotally connected by a hinge 56 at its rear end to a rear end of the frame 28, and the front end of the mount 54 is supported at an elevation above the frame so that the mount is angled upward from rear to front. The front end of the mount 54 is adjustably supported by long bolts 58 that are secured to the members 38 at lower ends of the bolts 58 using angle irons 60 having threaded openings. The front ends of the mount 54 has holes passing therethrough through which the bolts 58 pass, and nuts 62 are disposed on each bolt above and below the mount 54 to adjustably hold the mount in a desired position relative to the frame 28. Four belts 26 operatively connect the motor 14 to the axle 50 on which the cutting wheel 24 is mounted, and a belt guard 64 may be used for safety purposes. The use of four belts 26 of a width that are readily commercially available provides the strength and durability needed to power the cutting wheel 24 under a wide range of conditions and protects the motor 14 from damage due to sudden load changes, such as those that might be encountered when the cutting wheel 24 struck a knot or a rock. The belts 26 are inexpensive and easy to replace as needed, particularly in light of the adjustable mount 54.

Figure 4:
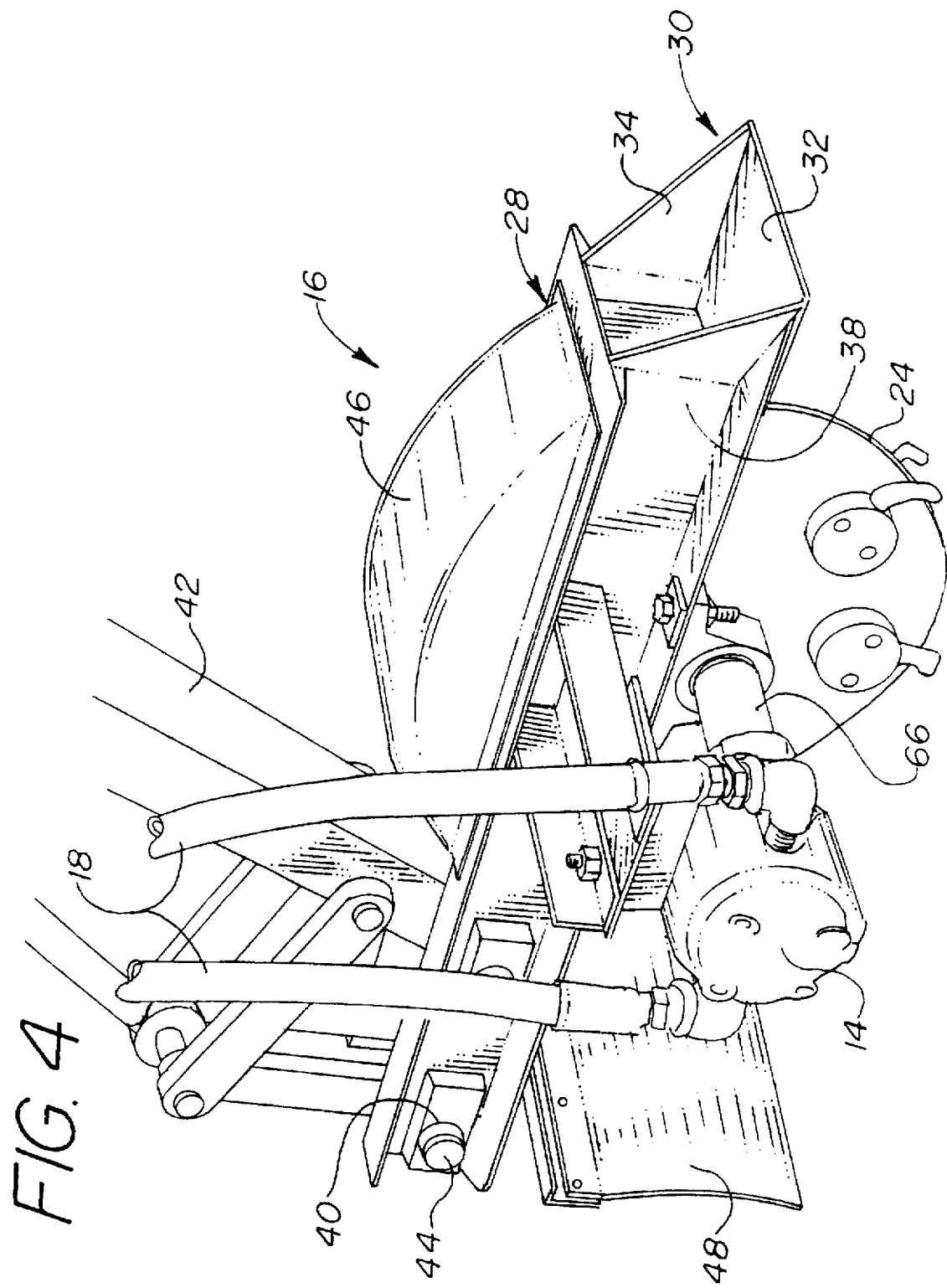
FIG. 4 is a perspective view of an alternate embodiment of a stump cutting device of the present invention.

In an alternate embodiment as shown in FIG. 4, the motor 14 may be connected to the axle 50 directly or using a coupling 66 that protects the motor from damage that might be caused by sudden load changes on the cutting wheel 24.

Figure 3:
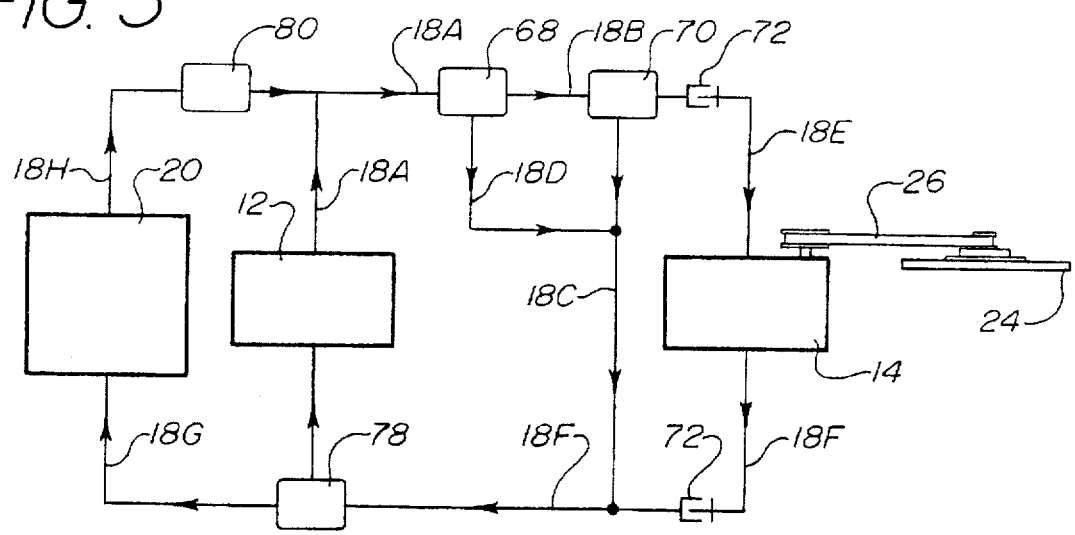
FIG. 3 is a schematic view of a system of the present invention.

Referring to FIG. 3, a plurality of lines 18 are provided to circulate hydraulic fluid between the pump 12 and motor 14 and to pass a portion of the hydraulic fluid to the hydraulic system 20 of the tractor 22 for cooling and filtering. On the high pressure side, line 18A connects the pump 12 to a high pressure relief valve 68 for reasons to be described. Line 18B passes from the high pressure relief valve 68 to a flow control valve 70 that may be used to control the speed of the cutting wheel 24. Flow control valve 70 has a built in bypass that diverts any unused portion of the hydraulic fluid to the return side of the pump 12 via line 18C and that may be used to divert all of the hydraulic fluid around the motor 14 so that the pump 12 may be operated without powering the motor 14 or rotating the cutting wheel 24. Line 18D from the pressure relief valve 68 also connects with line 18C to pass hydraulic fluid to the return side of the pump 12 when needed. Line 18E extends from the flow control valve 70 to the motor 14.

On the return side, line 18F extends between the motor 14 and the pump 12. Quick disconnect couplings 72 may be provided in lines 18E and 18F between the flow control valve 70 and the motor 14, preferably close to the flow control valve 70 to permit the cutting device 16 and most of the length of lines 18E and 18F to be quickly and easily removed from the backhoe arm 42 for when the backhoe is used for other purposes, such as digging. In that regard, once uncoupled, the lines 18E and 18F may be slid through and out of brackets 74. The couplings 72 could be located in any number of places, such as near the motor 14 and the lines 18E and 18F could be left on the boom 76 and arm 42 when the cutting device 16 is removed; this is not preferred because of the increased risk of damage to the lines 18E and 18F if they are left on while the boom 76 and arm 42 are used for digging.

Line 18C intersects line 18F to provide for high pressure relief when necessary or to permit a portion of the hydraulic fluid to bypass the motor 14 to control the speed of the motor 14. Brackets 74 secure the lines 18 to the backhoe arm 42 and backhoe boom 76 as desired to keep the lines from interfering with operation of the apparatus 10. As mentioned above, the lines 18E and 18F may be passed through brackets 74 so that the lines may be removed from the tractor 22 or backhoe when the cutting device 16 is removed.

A flow control check valve 78 and flow control needle valve 80 are provided for passing a portion of the circulating hydraulic fluid to and through the hydraulic system 20 of the tractor 22. Needle valve 80 connects lines 18H and 18A to allow hydraulic fluid from the hydraulic system 20 of the tractor to be fed into the hydraulic fluid circulating between the pump 12 and motor 14. Check valve 78 connects line 18F to line 18G for passing hydraulic fluid to the hydraulic system 20 of the tractor 22 at substantially the same rate that needle valve 80 adds to the fluid circulating between the pump 12 and motor 14. Line 18G passes hydraulic fluid from line 18F and check valve 78 to the hydraulic system 20 of the tractor, and line 18H passes hydraulic fluid from the hydraulic system 20 of the tractor 22 through needle valve 80 to the line 18A. The lines 18 are preferably conventional hoses but may take any number of forms. Also, it is understood that any number and arrangement of hoses, valves and/or quick disconnect couplings may be used to create any number of configurations for circulating hydraulic fluid between the pump 12 and motor 14 and for passing a portion of the circulating hydraulic fluid through the hydraulic system 20 of the tractor 22.

Figure 5:
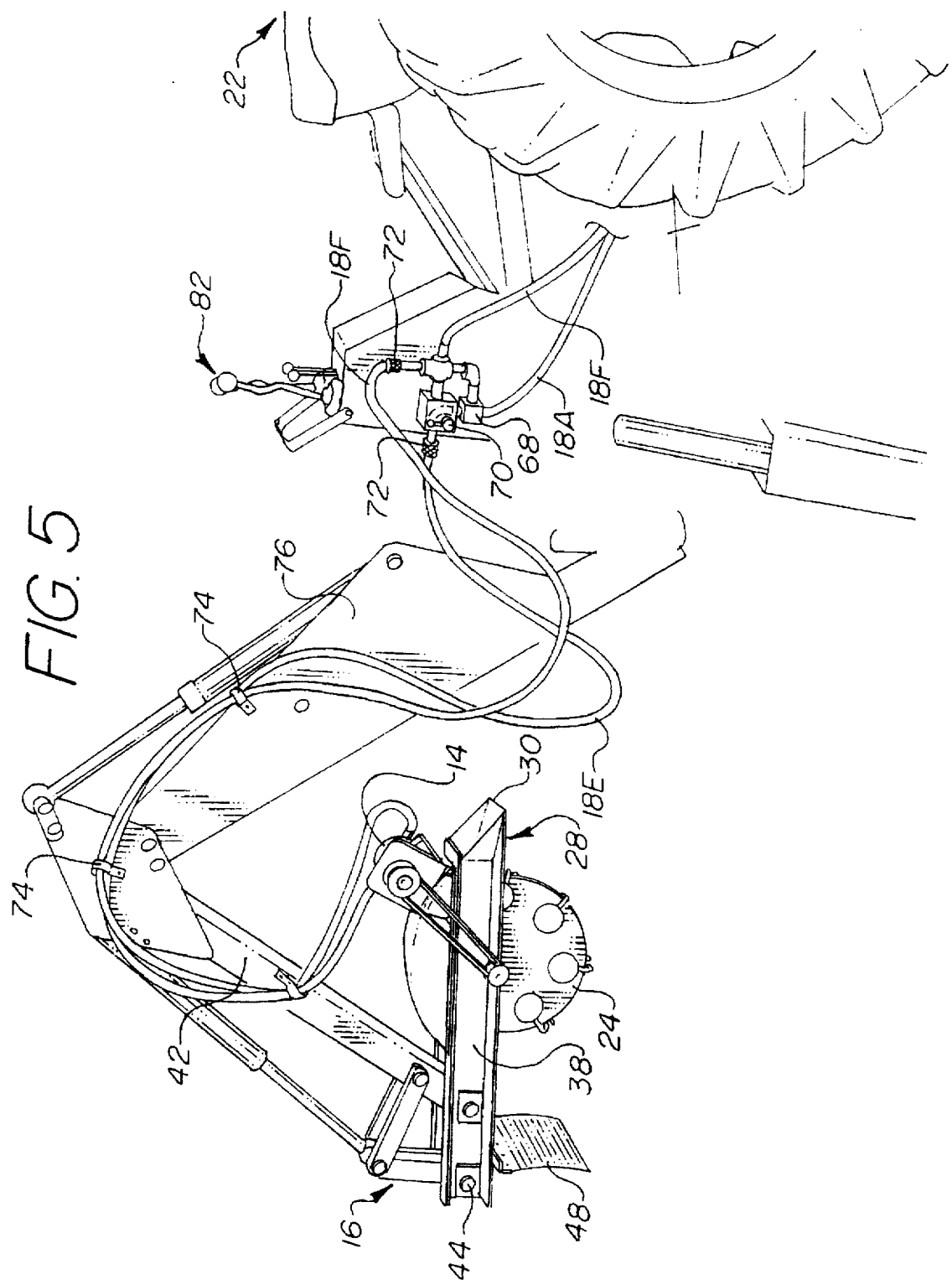
FIG. 5 is a side elevation of a tractor having a system of the present invention.

In operation, the tractor engine is started and power takeoff shaft is engaged for providing power to the pump 12. As best shown in FIG. 5, the flow control valve 70 is moved from a first position in which all hydraulic fluid being circulated by the pump 12 bypasses the motor 14 to a second position in which a desired portion of the circulating hydraulic fluid is routed to the motor 14 for powering the motor and rotating the cutting wheel 24. The operator utilizes the backhoe controls 82 in the usual manner to manipulate the backhoe boom 76 and arm 42, thereby manipulating the cutting device 16 back and forth over a stump for cutting or grinding the stump to the desired elevation. The backhoe arm 42 is easily moved back and forth to cut or grind the uppermost surface of the stump and is easily lowered as the uppermost surface of the stump is gradually cut closer to the ground. When the stump is cut to the desired level, the flow control valve 70 is returned from the second position to the first position so that the hydraulic fluid is routed to bypass the motor 14. Using the flow control valve 70 in this fashion permits the apparatus 10 to be quickly deployed and deactivated so that the tractor 22 may be moved from one location to another without waiting for the cutting wheel 24 to quit rotating.

During operation, the pump 12 preferably circulates hydraulic fluid between the pump and the motor 14 at a rate substantially within a range of approximately 15 to approximately 40 gallons per minute and more preferably at a rate substantially within a range of approximately 20 to approximately 25 gallons per minute. The needle valve 80 is adjusted to pass hydraulic fluid from the hydraulic system 20 of the tractor 22 to line 18A preferably at a rate of approximately 1 to approximately 5 gallons per minute and more preferably at a rate of approximately 1.5 to approximately 2.5 gallons per minute. Check valve 78 removes hydraulic fluid from line 18F and returns it to the hydraulic system 20 of the tractor 22, via line 18G, at substantially the same rate. The hydraulic fluid passing to the hydraulic system 20 of the tractor 22 is cooled and filtered, and the constant passing of a portion of the circulating hydraulic fluid through the hydraulic system 20 of the tractor 22 eliminates the need for separate equipment or components for treating the hydraulic fluid used by the apparatus 10. The use of lines to add and return fluid from and to the hydraulic system of the tractor eliminates the need for a separate tank, reservoir or storage receptacle for a large volume of hydraulic fluid that would otherwise be needed to operate the stamp cutting apparatus 10.

If it is desirable to use the backhoe boom 76 and arm 42 for another purpose, such as for use with a bucket for digging, the cutting device 16 may be quickly and easily removed by disconnecting lines at the quick disconnect couplings, respectively, and removing the pins 44. The cutting device 16 may then be removed from the arm 42, and the lines 18E and 18F pulled free of brackets 74. A bucket or other attachment may then be secured to the arm. The remaining components of the stump cutting apparatus 10 may remain attached to the backhoe and tractor 22, and the backhoe arm 42 and tractor may be used for other purposes.

Other modifications, changes and substitutions are intended in the foregoing, and in some instances, some features of the invention will be employed without a corresponding use of other features. For example, the scoop 30 may or may not be used as desired. Also, the motor 14 may be coupled to the cutting or grinding wheel or drum 24 in any conventional fashion. Further, the apparatus 10 may be connected to devices other than a backhoe arm 42 or boom 76 for manipulating the cutting device 16 about a stump. Further still, the frame 28 may take any number of shapes, sizes or configurations, and the scoop 30 may take any conventional size or shape and may be connected to the frame 28 in several locations, alignments and dispositions. The mount 54 may be aligned or disposed in any number of positions, may be connected to places other than the frame and may be fixed rather than adjustable. Also, although the motor 14 is described as being coupled to the cutting wheel with four belts 26, fewer or more belts of any conventional shape or composition may be used, and other coupling means such as chains may be used. Of course, all quantities, capacities, dimensions, sizes, speeds, rates and other numerical values are included only by way of example and are not intended to limit the scope of the invention. Similarly, the materials of construction and shapes of the various components may also be varied substantially without departing from the intended scope of the invention. Accordingly, it is appropriate that the appended claims be construed broadly and in a manner consistent with the scope of the invention.

What is claimed is:

1. A stump cutting or grinding apparatus, comprising:
   a pump for attachment to a power takeoff of a tractor;
   a cutting or grinding device for attachment to a backhoe arm of said tractor;
   a motor operatively connected to said cutting or grinding device for powering said cutting or grinding device;
   a plurality of lines for circulating hydraulic fluid between said pump and said motor; and a plurality of lines for circulating at least a portion of said hydraulic fluid through a hydraulic system of said tractor.

2. The apparatus of claim 1 wherein said cutting or grinding device comprises:

a frame for attachment to a backhoe arm; and a cutting wheel rotatably secured to said frame.

3. The apparatus of claim 2, further comprising a scoop secured to said frame.

4. The apparatus of claim 3 wherein said frame has a front end for attachment to said backhoe arm and wherein said scoop is secured to a rear end of said frame.

5. The apparatus of claim 1, further comprising a motor mount, a rear end of said motor mount being pivotally secured to said frame and a front end of said motor mount being supported at an elevation above said frame.

6. The apparatus of claim 5 wherein:

said motor is operatively connected to said cutting wheel by at least one belt; and said front end of said motor mount is adjustable relative to said frame to permit movement of said motor for tensioning said belt.

7. A stump cutting or grinding device, comprising:

a frame for attachment to a backhoe arm of a tractor;

a cutting or grinding wheel rotatably secured to said frame; and a scoop secured to said frame.

8. The device of claim 7 wherein said frame has a front end for attachment to said backhoe arm and wherein said scoop is secured to a rear end of said frame.

9. The device of claim 8, further comprising a motor secured to said frame and operatively connected to said cutting or grinding wheel for rotating said cutting or grinding wheel.

10. The device of claim 7, further comprising a motor mount, a rear end of said motor mount being pivotally secured to said frame and a front end of said motor mount being supported at an elevation above said frame.

11. The device of claim 10, wherein:

said motor is operatively connected to said cutting or grinding wheel by at least one belt; and said front end of said motor mount is adjustable relative to said frame to permit movement of said motor for tensioning said belt.

12. A method of operating a stump cutting or grinding system, comprising:

(a) providing a tractor having a backhoe arm, a cutting or grinding device attached to said backhoe arm, a pump connected to a power takeoff of said tractor and a motor operatively connected to said cutting or grinding device;

(b) circulating hydraulic fluid between said pump and said motor for powering said motor, thereby powering said cutting or grinding device; and (c) passing at least a portion of said circulating hydraulic fluid through a hydraulic system of said tractor.

13. The method of claim 12 wherein:

step (b) comprises pumping at least a portion of said circulating hydraulic fluid from said pump to said motor and returning at least a portion of said circulating hydraulic fluid from said motor to said pump; and step (c) comprises passing hydraulic fluid from said hydraulic system of said tractor to said hydraulic fluid being pumped from said pump to said motor and passing at least a portion of said returning hydraulic fluid to said hydraulic system of said tractor.

14. The method of claim 12 wherein step (b) comprises circulating said hydraulic fluid between said pump and said motor at a rate substantially within a range of approximately 15 to approximately 40 gallons per minute.

15. The method of claim 14 wherein step (c) comprises passing hydraulic fluid from said hydraulic system of said tractor at a rate substantially within a range of approximately 1 to approximately 5 gallons per minute.

16. The method of claim 15 wherein:

step (b) comprises circulating said hydraulic fluid between said pump and said motor at a rate substantially within a range of approximately 20 to approximately 25 gallons per minute; and step (c) comprises passing hydraulic fluid from said hydraulic system of said tractor at a rate substantially within a range of approximately 1.5 to approximately 2.5 gallons per minute.

17. A stump cutting or grinding apparatus, comprising:

a frame operatively connected to said tractor;

a cutting or grinding wheel rotatably secured to said frame;

a motor operatively connected to cutting or grinding wheel for rotating said cutting or grinding wheel;

means for circulating hydraulic fluid through said motor to power said motor, thereby rotating said cutting or grinding wheel; and means for passing at least a portion of said circulating hydraulic fluid through a hydraulic system of said tractor.

18. The apparatus of claim 17 wherein said means for circulating hydraulic fluid through said motor comprises:

a pump secured to a power takeoff of said tractor; and a first plurality of lines connecting said pump to said motor.

19. The apparatus of claim 18 wherein said means for passing at least a portion of said circulating hydraulic fluid through said hydraulic system of said tractor comprises a second plurality of lines operatively connecting said hydraulic system of said tractor to said first plurality of lines.

20. The apparatus of claim 17, further comprising a scoop secured to said frame.

* * * * *